United States Patent
Takano et al.

(10) Patent No.: US 7,652,638 B2
(45) Date of Patent: Jan. 26, 2010

(54) DISPLAY CONTROL APPARATUS, SYSTEM, AND DISPLAY CONTROL METHOD

(75) Inventors: Kentaro Takano, Tokyo (JP); Tohru Fuse, Tokyo (JP); Katsura Sakai, Tokyo (JP)

(73) Assignee: Fuji Xerox Co., Ltd., Tokyo (JP)

(*) Notice: Subject to any disclaimer, the term of this patent is extended or adjusted under 35 U.S.C. 154(b) by 718 days.

(21) Appl. No.: 11/248,266

(22) Filed: Oct. 13, 2005

(65) Prior Publication Data

US 2006/0284786 A1 Dec. 21, 2006

(30) Foreign Application Priority Data

Jun. 20, 2005 (JP) ............................... 2005-179987

(51) Int. Cl.
*G09G 5/00* (2006.01)
(52) U.S. Cl. ............................ 345/2.1; 345/2.2; 345/2.3
(58) Field of Classification Search ............ 345/1.1–3.4
See application file for complete search history.

(56) References Cited

U.S. PATENT DOCUMENTS

2005/0156810 A1 * 7/2005 Zerphy et al. ................. 345/1.1

FOREIGN PATENT DOCUMENTS

| JP | 9-154116 A | | 6/1997 |
|---|---|---|---|
| JP | 11177953 A | * | 7/1999 |
| JP | 2003-87758 A | | 3/2003 |

\* cited by examiner

*Primary Examiner*—Amr Awad
*Assistant Examiner*—Andre Matthews
(74) *Attorney, Agent, or Firm*—Sughrue Mion, PLLC

(57) ABSTRACT

A display control apparatus having capabilities of converting multiple images to be displayed in a first site to display said multiple images in a second site. The display control apparatus includes a receiver that receives information on a noteworthy image selected from said multiple images and setup information on at least one display device installed in the second site, a determination potion that determines a difference in number of display devices installed in the first site and the number of the display devices installed in the second site, on the basis of the setup information on said at least one display device, and a conversion portion that converts the information on said multiple images to display the noteworthy image in priority, on the basis of a result determined by the determination portion and the information on the noteworthy image.

5 Claims, 22 Drawing Sheets

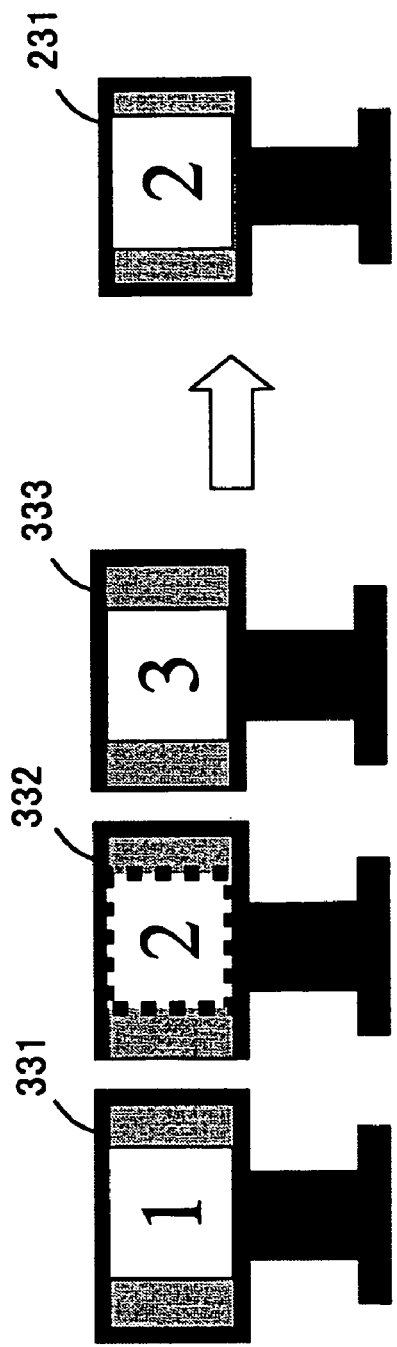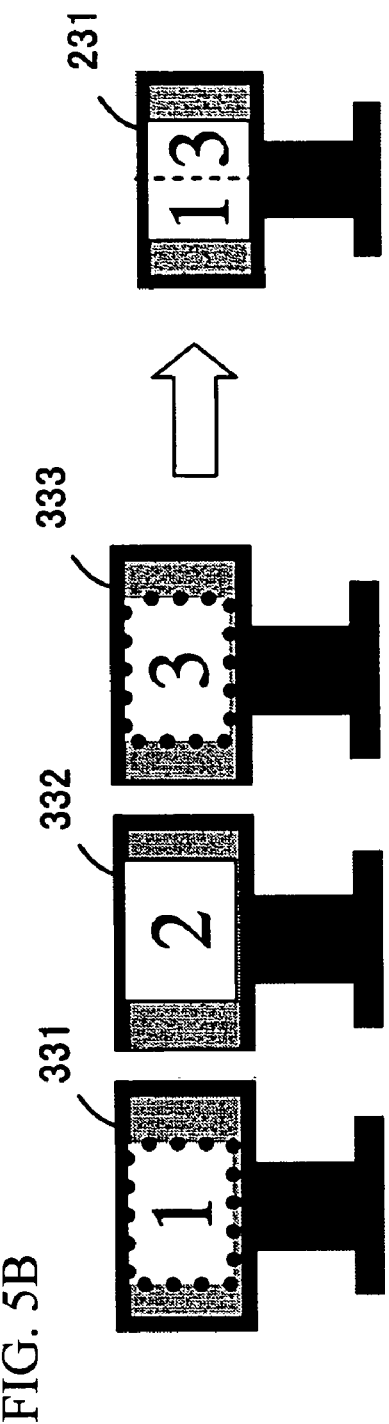

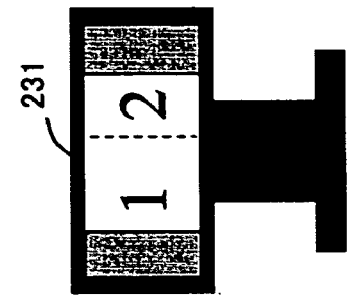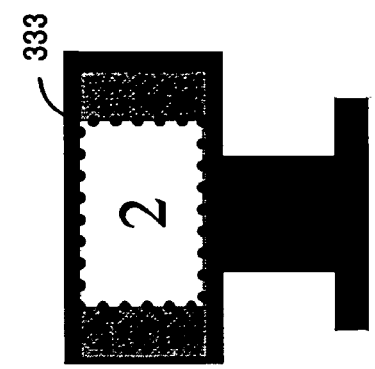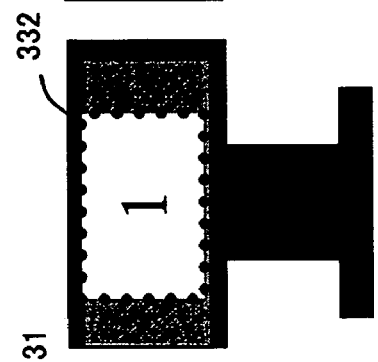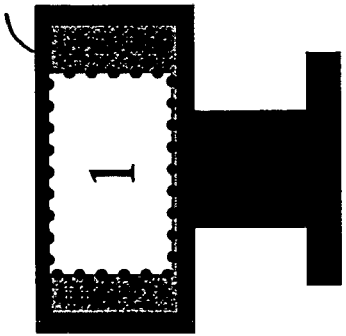
FIG. 9A
FIG. 9B

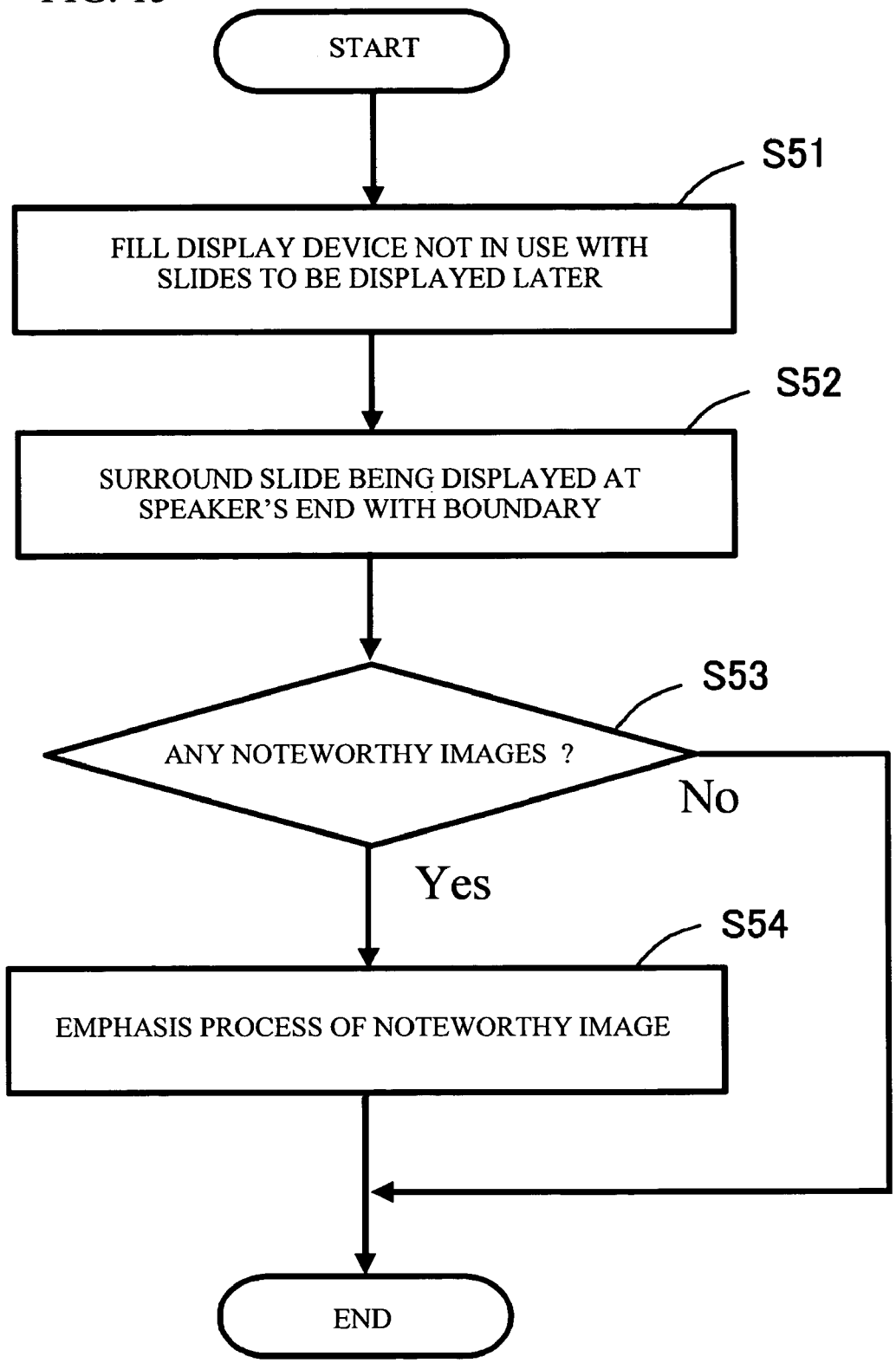

EMPHASIZED BY BRIGHTNESS

EMPHASIZED BY CONTRAST

IMAGE OTHER THAN NOTEWORTHY IMAGES IS DISPLAYED IN SEPIA

INFORM OF NOTEWORTHY IMAGE BY SOUND

INFORM OF NOTEWORTHY IMAGE BY ILLUMINATION

INFORM OF NOTEWORTHY IMAGE BY EMITTING LIGHT FROM FRAME OF DISPLAY DEVICE

DISPLAY CONTROL APPARATUS, SYSTEM, AND DISPLAY CONTROL METHOD

BACKGROUND OF THE INVENTION

1. Field of the Invention

This invention relates to display control apparatuses, systems, and display control methods.

2. Description of the Related Art

Conventionally, multi-display capabilities have been well known. With the multi-display capabilities, a set of computer is capable of operating multiple display devices. The multi-display capabilities allow viewing multiple kinds of information for the purpose of improving working efficiency or facilitating decision-making. "ePic" is mentioned as an example of realizing the multi-display capabilities. ePic, having been developed b yFXPAL (Fuji Xerox Palo Alto Laboratory), is an integrated presentation authoring and playback system that makes it easy to use a wide range of devices installed in one or multiple multimedia venues. A set of computer is capable of controlling multiple display devices by sending commands to personal computers (PC) connected via network. Also, RealMulti, having been developed by Project i Co., Ltd., includes the capabilities of controlling a server connected to multiple display devices via the network.

The above-described techniques can be controlled via the network, enabling remote multi-display capabilities. By a combination with a teleconference system or the like, the advantage of the multi-display capabilities can be utilized in communicating with people in remote locations.

There have been proposed conventional techniques relating to the multiple display devices and the video conference equipment in Japanese Patent Application Publication No. 2003-87758 (hereinafter, referred to as Document 1) and Japanese Patent Application Publication No. 9-154116 (hereinafter, referred to as Document 2). Document 1 discloses the technique for recording still images displayed on the multiple display devices in synchronization with moving images and sound, although the still images are respectively displayed as single images, and then reproducing the still images respectively displayed on the multiple display devices in synchronization with the moving images and sound. Document 2 discloses the technique for learning the images being respectively displayed in two remote sites during the teleconference and then understanding the targets being pointed by cursors on terminal computers at the other ends.

While communication is being held between remote sites, however, if the sites are different in the configuration of the display devices, for example, if the numbers of the display devices are different, it is impossible to correspond the document being displayed at a speaker's end and the document being displayed at an audience's end on one-on-one basis. This causes the problem in that the documents cannot be assigned to the display device appropriately. In the technique disclosed in Document 1, the documents being displayed on all the display devices are put into a single image, yet leading to degradation of visibility.

If the sites are different in the positional relationship of the display configuration and display devices, it is not appropriate to instruct the positional relationship by mentioning, "right" or "left" verbally. Therefore, there is the problem in that viewers do not know which display device they should look at. In the technique disclosed in Document 2, the cursor is shared by the teleconferencing terminals to learn the positions pointed by the cursors on the terminals at the other ends. However, if the numbers of the display devices are different between the sites, the problem that the viewers do not know which display device they should look at cannot be solved.

SUMMARY OF THE INVENTION

The present invention has been made in view of the above circumstances and provides a display control apparatus, system, and display control method that can provide easily viewable images to viewers in order to share the information between teleconferencing sites, even if the numbers of display devices are different between the teleconferencing sites.

According to one aspect of the present invention, there may be provided a display control apparatus having capabilities of converting multiple images to be displayed in a first site to display said multiple images in a second site, the display control apparatus including a receiver that receives information on a noteworthy image selected from said multiple images and setup information on at least one display device installed in the second site; a determination potion that determines a difference in number of display devices installed in the first site and the number of the display devices installed in the second site, on the basis of the setup information on said at least one display device; and a conversion portion that converts the information on said multiple images to display the noteworthy image in priority, on the basis of a result determined by the determination portion and the information on the noteworthy image. According to the present invention, even if the numbers of the display devices are different between the sites while the information is being shared by the sites, it is possible to provide easily viewable images to a viewer without degrading the information, because the noteworthy image can be displayed in priority.

According to another aspect of the present invention, there may be provided a system having the above-described display control apparatus and terminals. Each of the terminals may include a select portion that selects a noteworthy image and a send portion that sends the noteworthy image selected by the select portion.

According to a further aspect of the present invention, there may be provided having the above-described display control apparatus and terminals. Each of the terminals may include a select portion that selects a noteworthy image and a send portion that sends said multiple images converted by the display control apparatus.

According to a further aspect of the present invention, there may be provided a display control method of converting information on multiple images to be displayed in a first site to display said multiple images in a second site, the display control apparatus including receiving the information on a noteworthy image selected from said multiple images and setup information on at least one display device installed in the second site; determining a difference in number of display devices installed in the first site and the number of the display devices installed in the second site, on the basis of the setup information on said at least one display device; and converting the information on said multiple images to display the noteworthy image in priority, on the basis of a result determined by the determination portion and the information on the noteworthy image.

BRIEF DESCRIPTION OF THE DRAWINGS

Embodiments of the present invention will be described in detail based on the following figures, wherein:

FIGS. 5A and 5B are views showing examples of display converted by the display conversion portion;

FIGS. 9A and 9B show other examples of the display conversion in a case where there are multiple noteworthy images;

FIG. 15 is a flowchart showing the display conversion process shown in FIGS. 14A and 14B;

DESCRIPTION OF THE EMBODIMENTS

A description will now be given, with reference to the accompanying drawings, of embodiments of the present invention.

Figure 1:
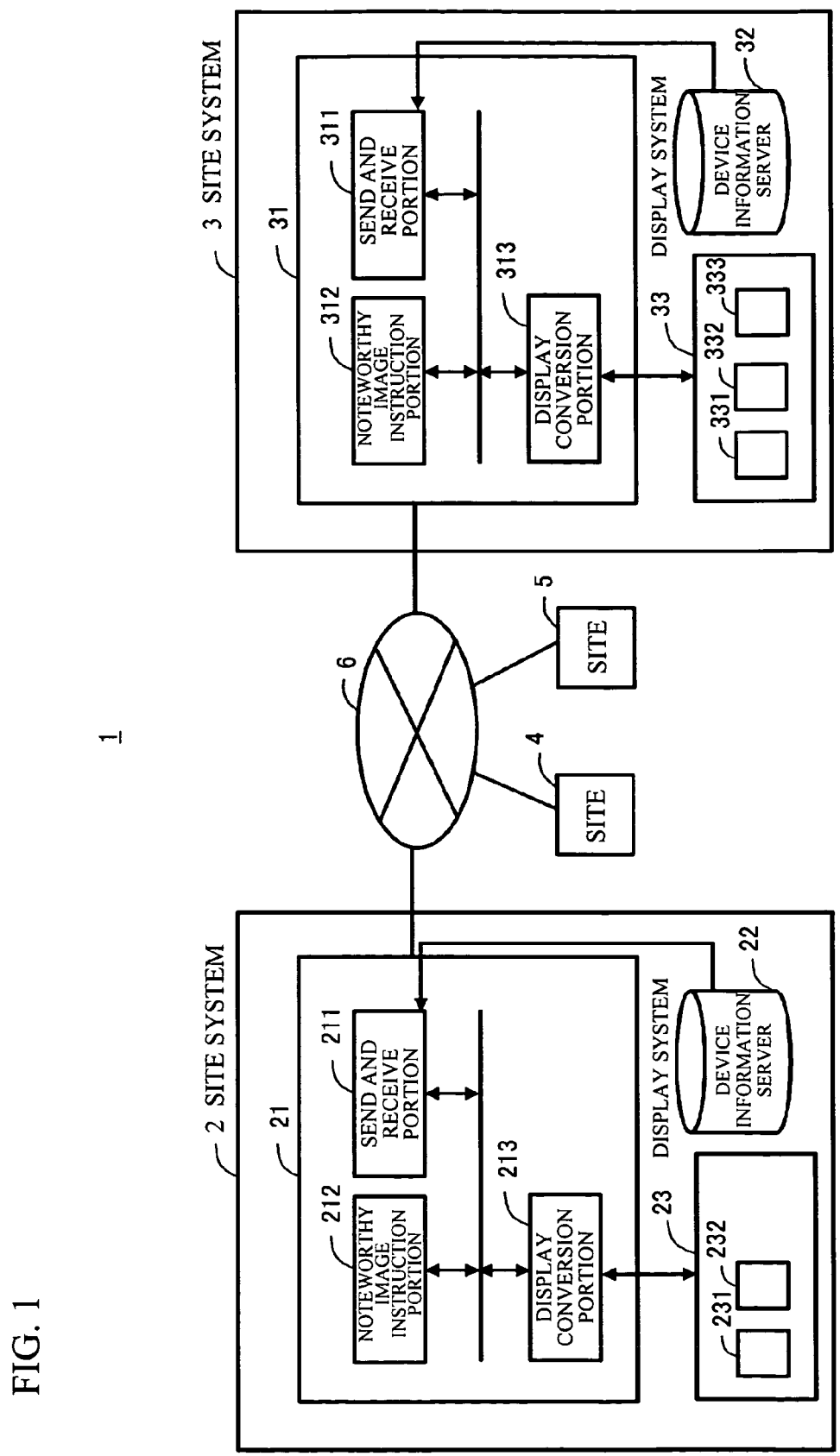
FIG. 1 is a system configuration in accordance with an embodiment of the present invention.

FIG. 1 shows a system configuration in accordance with an embodiment of the present invention. A description will be given of an example in which a display control apparatus in accordance with an embodiment of the present invention is applied to the remote teleconferencing. A system 1 includes site systems 2 through 5. The site systems 2 through 5 are connected via a network 6. For instance, while a remote meeting is being held among the site systems 2 through 5, images being displayed on a display device installed in the site system 3 are transmitted to the site systems 2, 4, and 5 via the network 6. Display devices are respectively installed in the site systems 2, 4, and 5 to display the images being displayed on the display device installed in the site system 3.

The site system 2 (a second site) includes a management server (display control device) 21, a device information server 22, and a display system 23. In the same manner, the site system 3 (a first site) includes a management server (terminal) 31, a device information server 32, and a display system 33. The display system 23 in the site system 2 includes two display devices 231 and 232. The display system 33 in the site system 3 includes three display devices 331, 332, and 333. As described above, the site systems 2 through 5 are different in the configuration of the display system, and accordingly, the images on which the attention should be focused have to be displayed carefully and suitably. Therefore, the site system 2 has capabilities of converting multiple images being displayed on the display system 33 so as to display the images on the display system 23. The site systems 4 and 5 are configured in the same manner, and a description is omitted here. In addition, the following description will be given on the basis that the site systems are respectively different in number of the display devices.

The management server 21 controls the whole site system 2. The management server 21 has capabilities of converting multiple images being displayed on the display system 33 in the site system 3 so as to display the images on the display system 23 in the site system 2. The device information server 22 stores setup information on the display system provided in the respective sites. Specifically, the device information server 22 stores information such as the number of the display devices, resolutions thereof, positional relationships of the display devices, and vertical or horizontal arrangement. The device information server 22, according to the request from the management server 21, provides the setup information on the display systems provided in the respective sites. In accordance with the present embodiment of the present invention, the device information server 22 is provided in each site, yet only one server provided on the network 6 may control and manage the setup information of all the display devices in the display system installed in the respective site systems.

The display system 23 includes display devices 231 and 232. The display devices 231 and 232 respectively display given images on the basis of the information on the images sent from the management server 21. Each of the display devices 231 and 232 is composed, for example, of a device for displaying an image or a projector. The management server 21 includes a send and receive portion 211, a noteworthy image designation portion 212, and a display conversion portion 213. The send and receive portion 211 controls sending and receiving data with other site systems 3 through 5. The send and receive portion 211 receives information on the image to be focused on (noteworthy image) selected from multiple images, from the site system 3, and further receives the setup information on the display system 23 in the site system 2, from device information server 22.

For example, a noteworthy image is selected from multiple images to be displayed by a noteworthy image instruction portion 312 in the site system 3, and then, a send and receive portion 311 in the site system 3 transmits, to the other site systems 2, 4, and 5, the information on the number of the display devices in the display system 33 and the information on the noteworthy image that a speaker is displaying in the site system 3. The send and receive portion 211 receives, from the site system 3, the information on the number of the display devices in the display system 33 and the information on the noteworthy image that the speaker is displaying in the site system 3, and then transmits the information received to the display conversion portion 213.

The noteworthy image designation portion 212 is provided for selecting the noteworthy image from multiple images to be displayed. The noteworthy image designation portion 212 designates in advance which slides are displayed in synchronization in chronological order. In addition, the noteworthy image designation portion 212 is capable of designating slides to be described by the speaker and which slide is important at which point.

The send and receive portion 211 transmits the information on the noteworthy image selected by the noteworthy image designation portion 212, to the other site systems 3 through 5. The display conversion portion 213 determines the difference between the number of the display devices of the display system 33 to display multiple images in the site systems 3 and the number of the display devices of the display system 23 in the site system 2. Then, the display conversion portion 213 converts the information on multiple images so as to display the noteworthy image in priority on the basis of a determination result and the information on the noteworthy image. In this manner, the display conversion portion 213 determines the difference between the number of the display devices in the display system 33 on which the speaker is going to display multiple images in the site systems 3 and the number of the display devices of the display system 23 in the site system 2, on the basis of the information on the display device that the speaker is going to display the images and the setup information on the display devices installed in the site system 2. Hence, it is possible to deal with an unexpected event such as a case where the display device is broken down in the site system 3 and the number of the display devices in the display system 33 is decreased or another case where a display device is newly introduced and the number of the display devices is increased. The display conversion portion 213 may be configured to determine the difference between the display system 33 in the site system 3 and the display system 23 in the site system 2. The display devices 231 and 232 respectively display or project the images on the basis of the information on multiple images converted by the display conversion portion 213.

A description below will be given of an example in which the noteworthy image, which has been designated by the noteworthy image instruction portion 312 included in the site system 3, is displayed emphatically. A description will be given on the assumption that the information on the noteworthy image designated by the noteworthy image instruction portion 312 in the site system 3 is transmitted respectively to the site systems 2, 4, and 5 via the send and receive portion 311. Also, in the description below, the display device is taken as an example, yet a projector may be applied.

Figure 2:
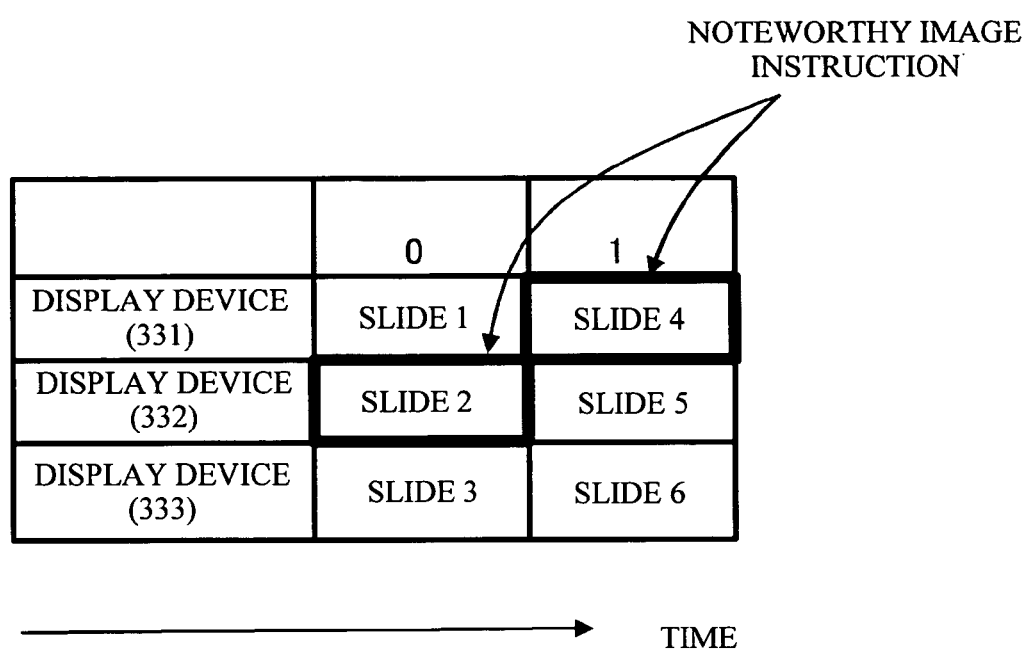
FIG. 2 is a view showing a user interface used for a noteworthy image instructed by a noteworthy image instruction portion.

FIG. 2 is a view showing a user interface used for the noteworthy image instructed by the noteworthy image instruction portion 312. In an example shown in FIG. 2, at the first timing, it is configured to respectively display a "slide 1" on the display device 331, a "slide 2" on the display device 332, and a "slide 3" on the display device 333 in the site system 3. At the next timing, it is configured to respectively display a "slide 4" on the display device 331, a "slide 5" on the display device 332, and a "slide 6" on the display device 333. The speaker operates the noteworthy image instruction portion 312 and designates the "slide 2" and the "slide 4" as the noteworthy images.

Figure 3:
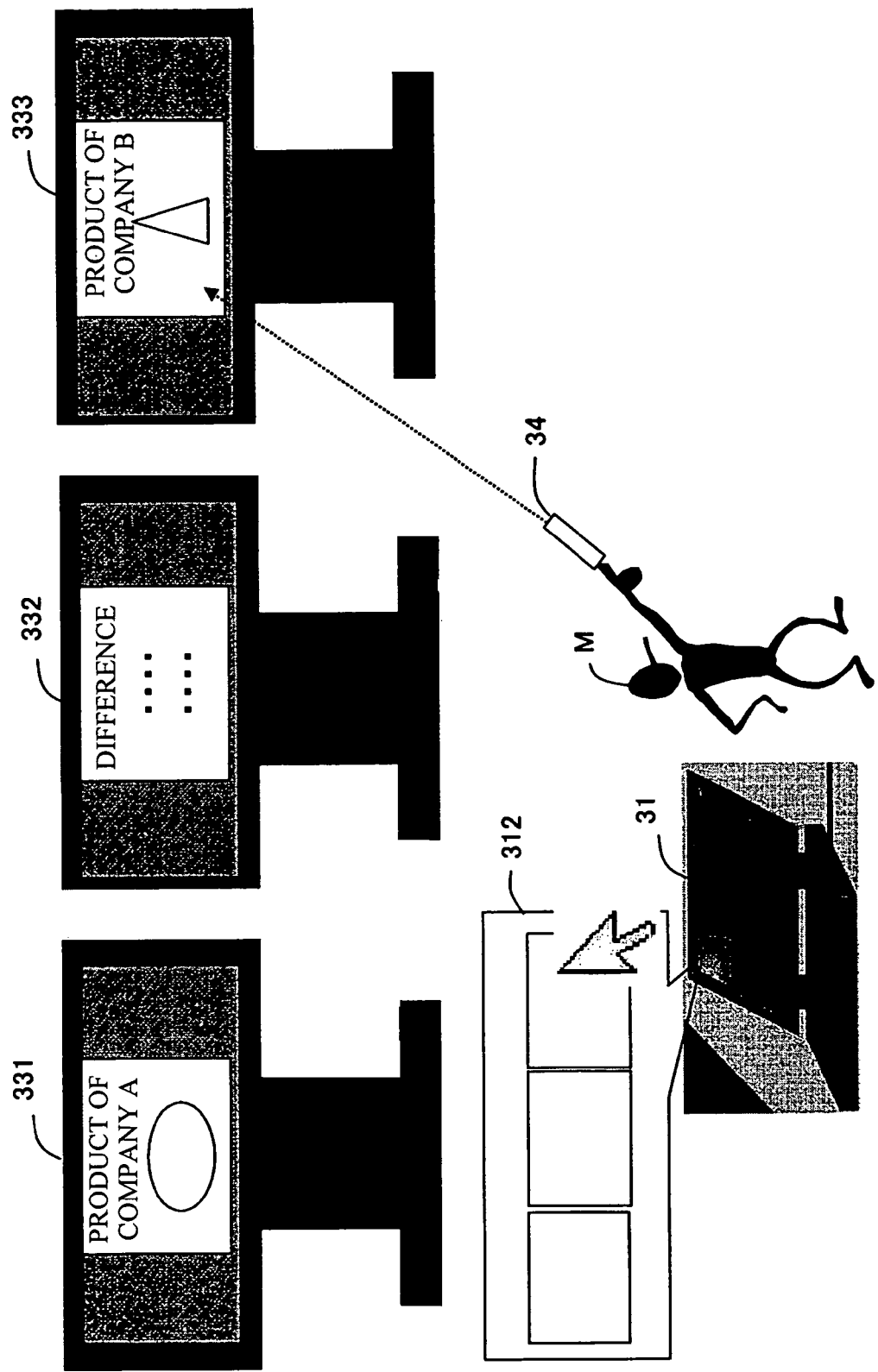
FIG. 3 is a view illustrating how to designate the noteworthy image.

FIG. 3 is a view illustrating how to designate the noteworthy image. According to the instruction given by a speaker M, the images that have been designated for displaying on the display devices are respectively displayed on the display devices 331 through 333. The noteworthy image is instructed by the management server 31 connected to the display devices 331 through 333. The noteworthy image instruction portion 312 provided on the management server 31 operates as a graphical user interface. The speaker M is able to give instructions to the noteworthy image instruction portion 312 provided on the management server 31 by using a mouse or typing on the display of the management server 31 so as to give instructions of the noteworthy images in real time, while delivering the presentation.

The noteworthy image instruction portion 312 may recognize directions of a three-dimensional pointer, device attached to a finger, laser pointer, finger, fescue, or the like in order to specify the noteworthy image. The method for pointing the noteworthy image is not limited to the afore-mentioned one. The noteworthy image may be specified by verbally expressing a keyword such as "image on the right", "product of Company B", or may be specified by recognizing the voice uttering a slide title or content. If the slide content is uttered, the noteworthy image may be specified automatically by analyzing the slide content. When the noteworthy image is designated by the noteworthy image instruction portion 312, the send and receive portion 311 transmits the information on the noteworthy image together with the information on multiple images to the other site systems 2, 4, and 5.

Figure 4:
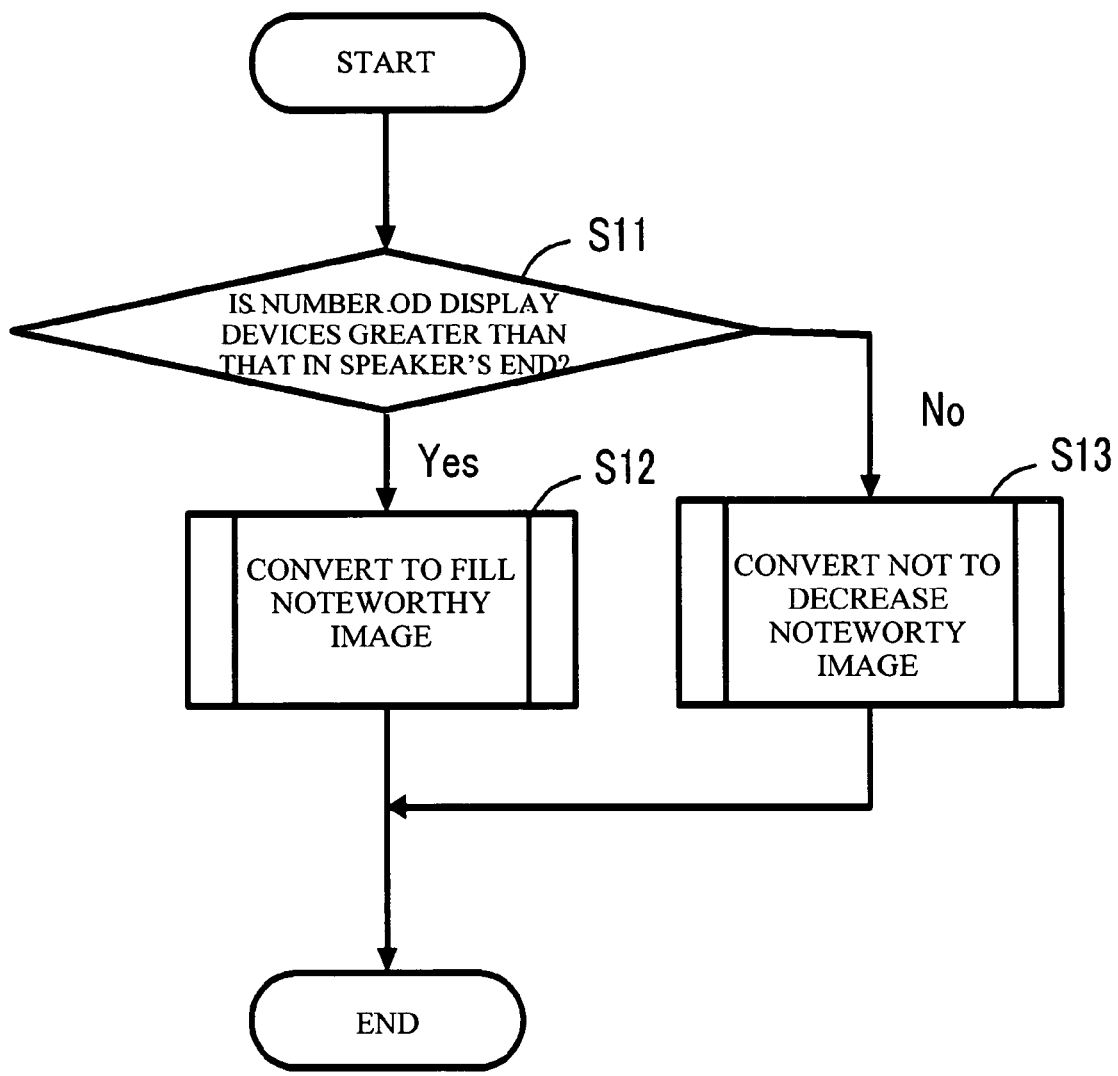
FIG. 4 is a flowchart showing a process of a display conversion portion.

FIG. 4 is a flowchart showing a process of the display conversion portion 213. In step S11, the display conversion portion 213 refers to the setup information on the display system, which is installed on the site, acquired from the device information server 22, and determines whether the number of the display devices of the display system 23 installed in the site system 2 is greater than the number of the display devices in the display system 33 installed in the site system 3.

In step S12, if the number of the display devices in the display system 33 installed in the site system 3 is greater than the number of the display devices of the display system 23 installed in the site system 2, the display conversion portion 213 converts the information on multiple images so as to fill and display the noteworthy image on the display system 23 of the site system 2, which is not to be used. This makes it possible to display the noteworthy image on the display device not to be used. That is to say, this makes it possible to display the noteworthy image in priority, enabling the noteworthy image to be displayed emphatically. In step S13, if the number of the display devices of the display system 33 installed in the site system 3 is smaller than the number of the display devices of the display system 23 installed in the site system 2, the display conversion portion 213 converts the information on multiple images so as to display the noteworthy image in priority. This makes it possible to prevent the noteworthy image from failing to be displayed.

FIGS. 5A and 5B are views showing examples of display converted by the display conversion portion 213. FIG. 5A is an example of display conversion in a case where there is one noteworthy image. FIG. 5B is an example of display conversion in a case where there are multiple noteworthy images. In an example shown in FIGS. 5A and 5B, there are three display devices 331, 332, and 333 in the site system 3, and there is one display device 231 in the site system 2. Referring to FIG. 5A, in the site system 3, the "slide 1" is displayed on the display device 331, the "slide 2", which is the noteworthy image" is displayed on the display device 332, and the "slide 3" is displayed on the display device 333. In the site system 2, the "slide 2", which is the noteworthy image", is displayed on the display device 231. Referring now to FIG. 5B, in the site system 3, the "slide 1" is displayed on the display device 331, the "slide 2" is displayed on the display device 332, and the "slide 3", which is the noteworthy image, is displayed on the display device 333. In the site system 2, a slide that combines the noteworthy image of "slide 1" and the noteworthy image of "slide 3" is displayed on the display device 231.

Figure 6:
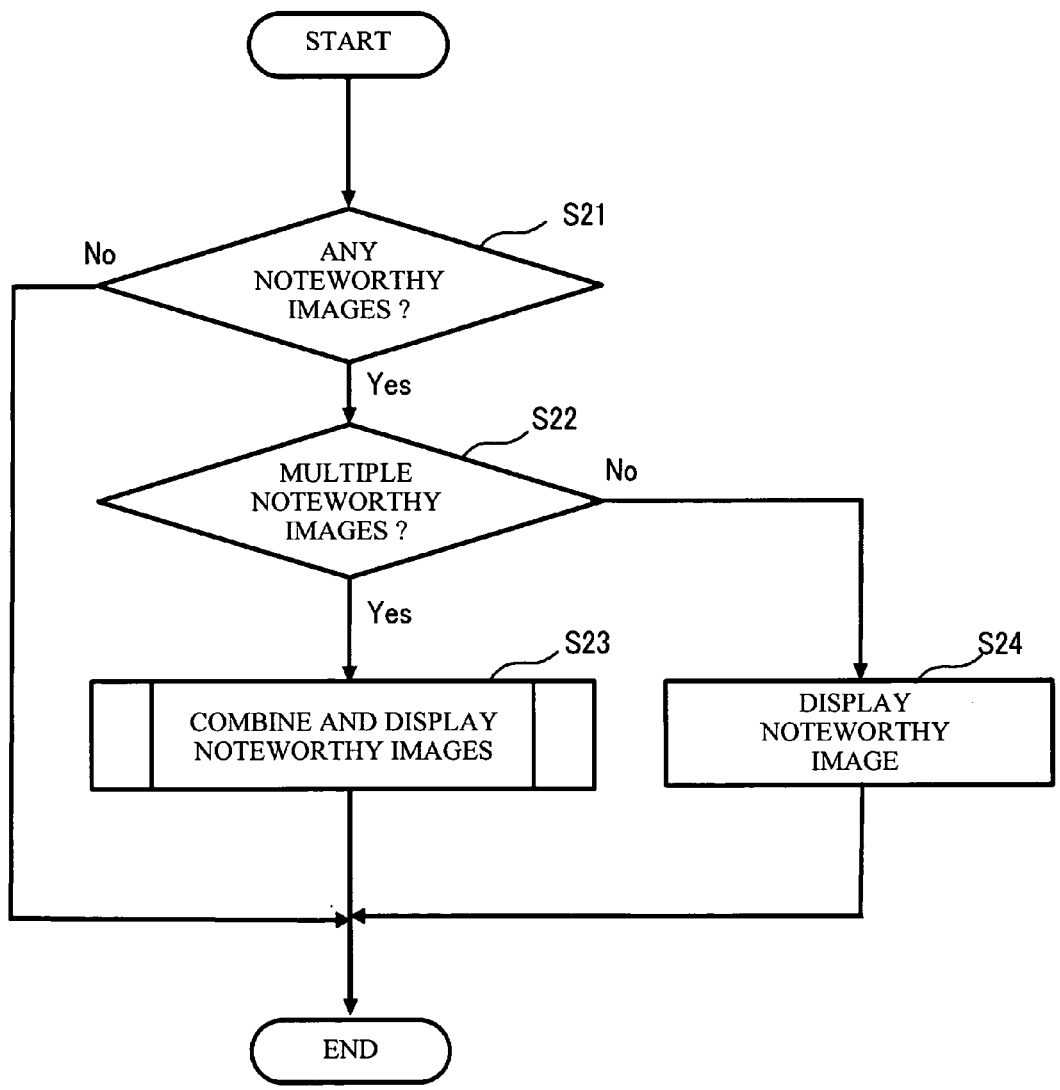
FIG. 6 is a flowchart showing the display conversion process implemented by the display conversion portion 213 according to the number of the display devices.

FIG. 6 is a flowchart showing and is play conversion process implemented by the display conversion portion 213 according to the number of the display devices. The noteworthy image is designated by the noteworthy image instruction portion 312 in the site system 3, and the information on the noteworthy image together with the information on multiple images is transmitted to the site system 2 via the network 6. The send and receive portion 211 receives the information on the noteworthy image, and further receives the setup information on the display system 23 in the site system 2, from the device information server 22. In step S21, it is determined whether there is the noteworthy image on the basis of the information on the noteworthy image. If there are multiple noteworthy images as shown in FIG. 5B in step S22, the display conversion portion 213 implements a process of combining the noteworthy images of the "slide 1" and the "slide 3" in step S23. If the number of the noteworthy images is greater than the number of the display devices in the display system 23 in the site system 2, the display conversion portion 213, for example, converts the information on multiple images so as to combine and display the noteworthy images.

If there are not multiple noteworthy images in step S22, the display conversion portion 213 converts the information on multiple images so as to display only the noteworthy image of the "slide 2" on the display system 23 in the site system 3 in step S24. In this manner, only the noteworthy image is displayed. Accordingly, the image about which the speaker is talking can be recognized even at a remote site, and in addition, it is possible to display the noteworthy image without degrading the visibility, as compared to a case where all the images are combined and displayed together.

Figure 7A:
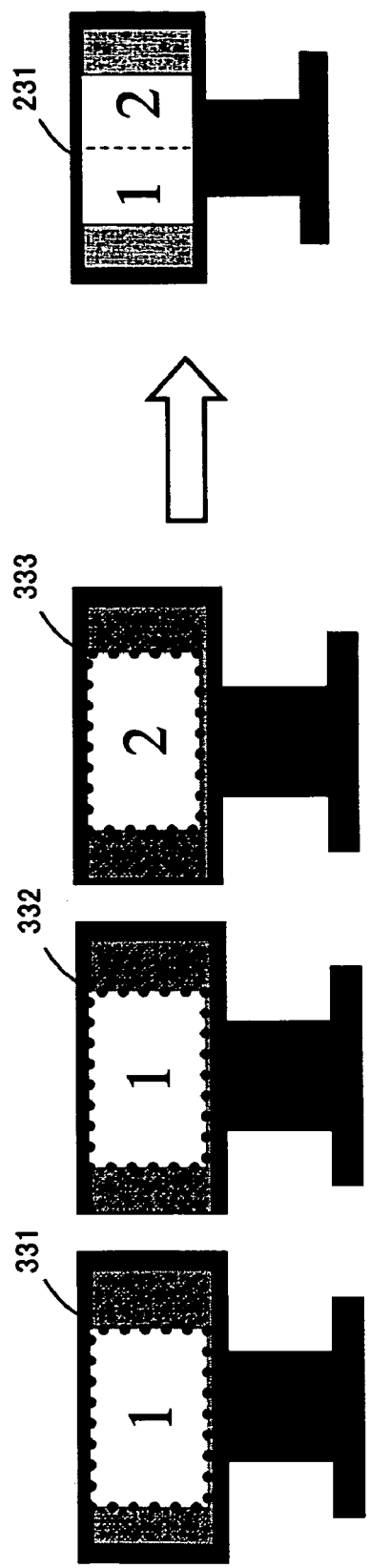
FIGS. 7A and 7B show examples of display conversion in a case where there are multiple noteworthy images.
Figure 7B:
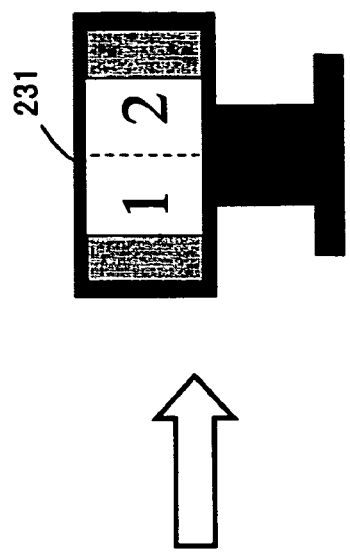
Figure 8:
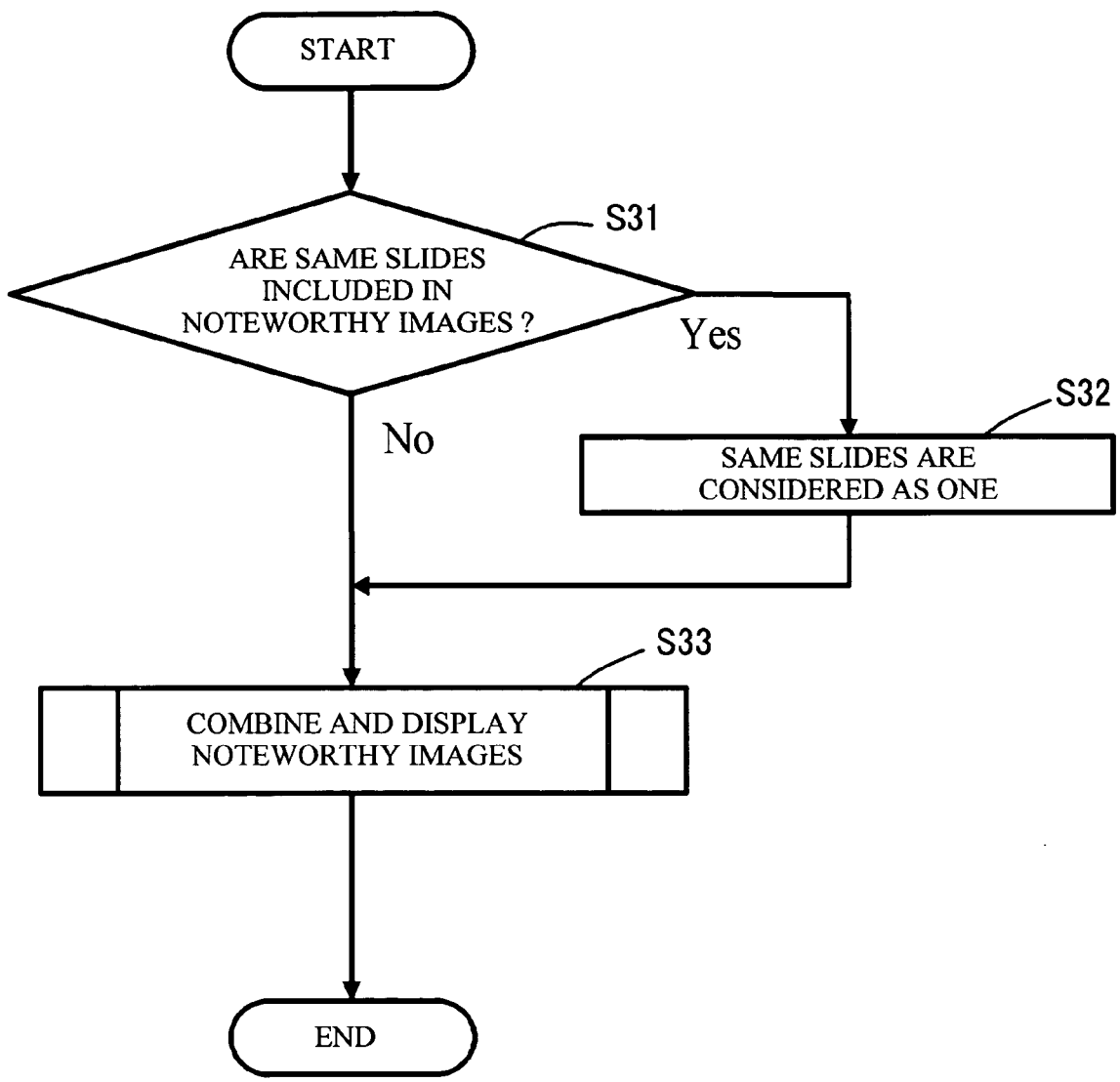
FIG. 8 is a flowchart showing the display conversion process implemented in step S23 in detail.

FIGS. 7A and 7B show examples of display conversion in a case where there are multiple noteworthy images. FIG. 7A is a display example of the display system 33 in the site system 3. FIG. 7B is a display example in a case where the site system 2 includes only one display device 231. Referring to FIG. 7A, the "slide 1" and the "slide 2" are noteworthy images surrounded by dotted lines. FIG. 8 is a flowchart showing the display conversion process implemented in step S23 in detail. The display conversion portion 213 determines whether the same noteworthy images are included in multiple noteworthy images in step S31. As shown in FIG. 7A, if there are same multiple noteworthy images, the noteworthy images of the same content are considered as one image in step S32, and then go to step S33. If the same multiple noteworthy images are not included in the noteworthy images in step S31, go to step S33. Then, in step S33, the display conversion portion 213 combines the noteworthy images of the "slide 1" and the "slide 2".

Figure 10:
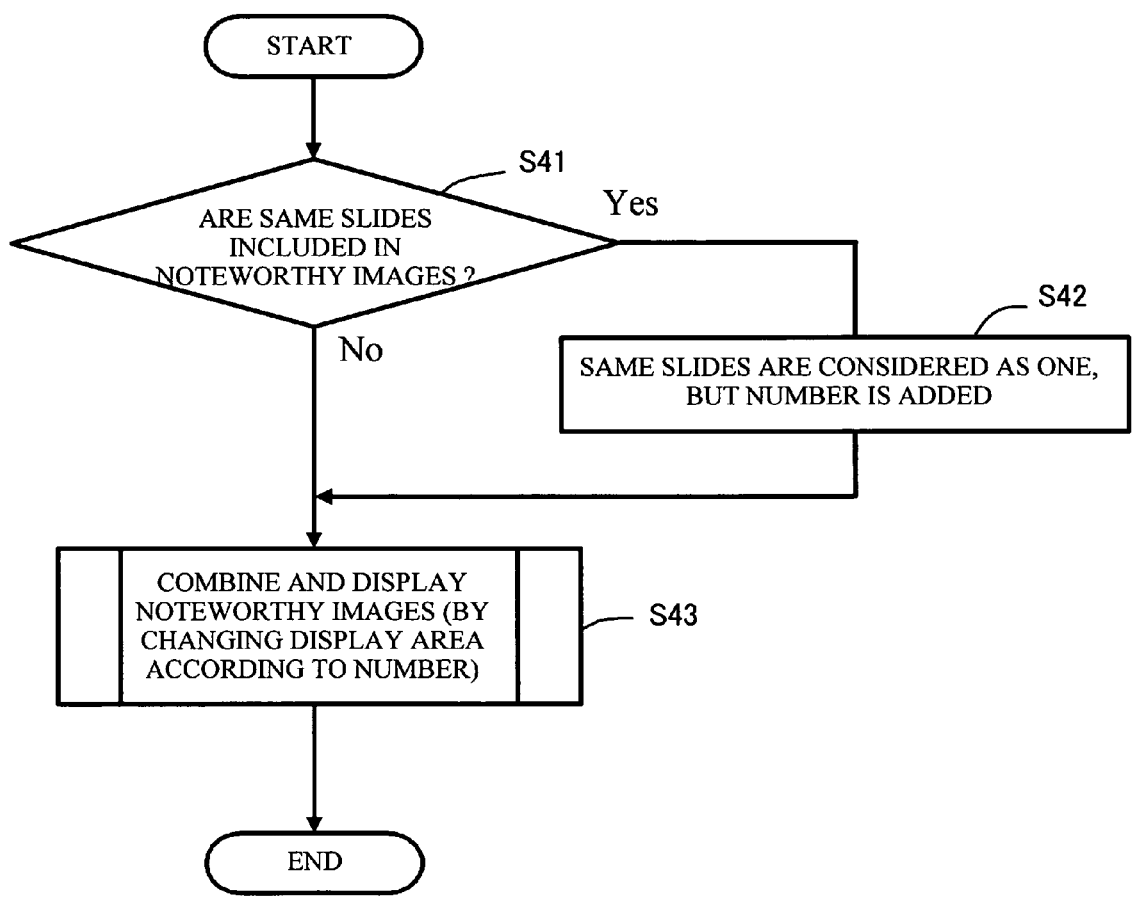
FIG. 10 is a flowchart showing the display conversion process implemented in the step S23 in detail.

FIGS. 9A and 9B show other examples of the display conversion in a case where there are multiple noteworthy images. FIG. 9A is a view showing a display example on the display system 33 in the site system 3. FIG. 9B is a view showing a display example in a case where the site system 2 includes only one display device 231. Referring to FIG. 9A, the noteworthy images of the "slide 1" and the "slide 2" are surrounded by dotted lines. FIG. 10 is a flowchart showing the display conversion process implemented in the step S23 in detail. In step S41, the display conversion portion 213 determines whether the same noteworthy images are included in multiple noteworthy images. If there are the same noteworthy images are included in multiple noteworthy images, the noteworthy images of the same content are considered as one image, yet each of the number of the same noteworthy images is added to a total number and go to step S43. In step S43, the display conversion portion 213 combines the noteworthy image of the "slide 1" in consideration of a display area according to the number of the noteworthy images of the "slide 1", although the noteworthy images are considered as one image. For instance, the display conversion portion 213 converts the information on the multiple images so that a display area size of the same noteworthy image becomes greater as the number of the same noteworthy images increase. Based on the display area size of the noteworthy image, the viewer is able to learn the priority and easily understand which noteworthy image should be focused on.

Figure 11A:
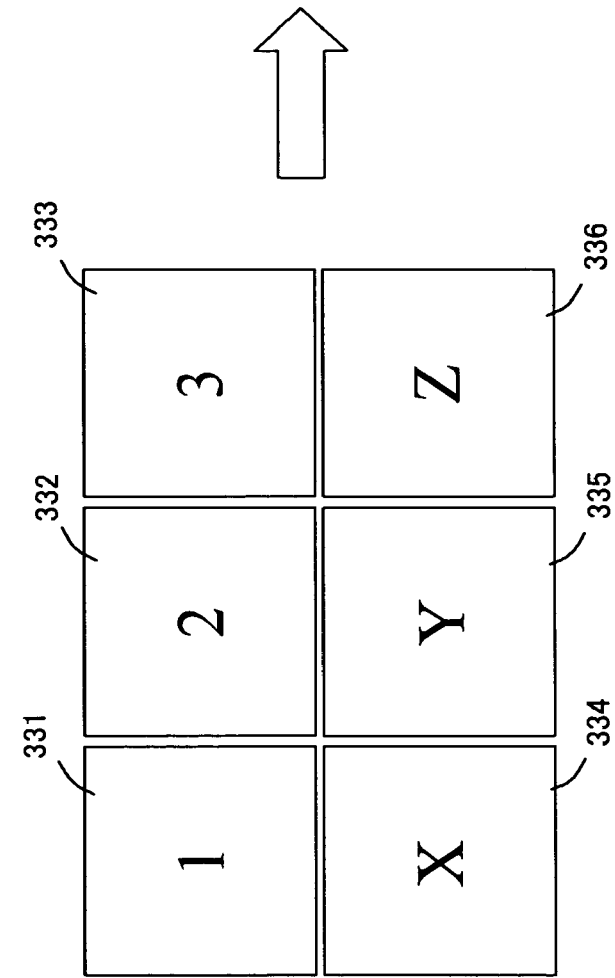
FIGS. 11A and 11B are views illustrating the display conversion process for extracting a condensed portion of the images and combining the images.
Figure 11B:
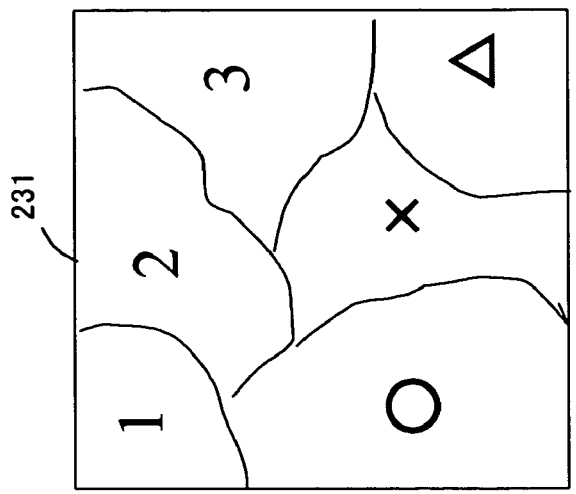

FIGS. 11A and 11B are views illustrating the display conversion process for extracting a condensed portion of the images and combining the images. FIG. 11A is a display example in a case where the site system 3 includes six display devices 331 through 336. FIG. 11B is a display example in a case where the site system 2 includes one display device 231. The display conversion portion 213 implements the display conversion process to extract the condensed portion from these images and combine the images, on the basis of the information on "slides 1 through Z" being displayed on the display devices 331 through 336 installed in the site system 3, as shown in FIG. 11B. The display conversion portion 213 extracts the condensed portion of the images and then combines the images by using the "stained-glass" algorithm described in the following document.

"Stained-Glass Visualization for Highly Condensed Video Summaries", Proceedings of 2004 IEEE International Conference on Multimedia and Expo (ICME 2004).

Figure 12B:
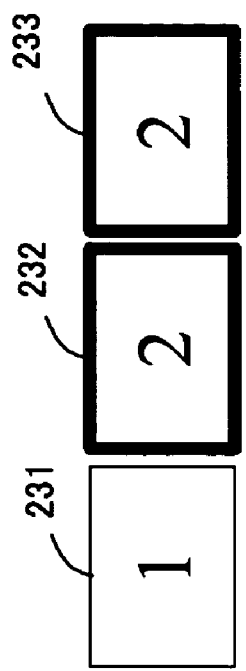
FIGS. 12A and 12B are views showing an example of display conversion in a case where the noteworthy image is filled.
Figure 12A:
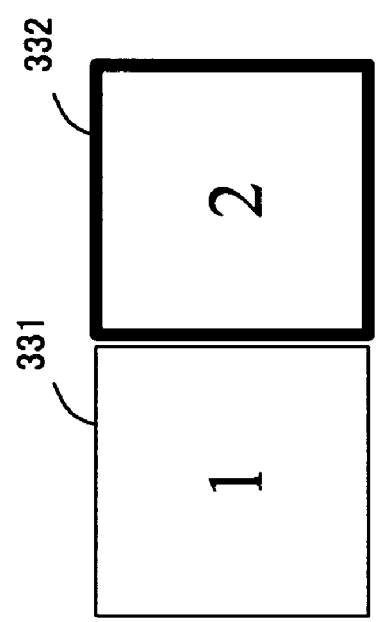

FIGS. 12A and 12B are views showing an example of display conversion in a case where the noteworthy image is filled. FIG. 12A is a view illustrating a display example in a case where the site system 3 includes two display devices 331 and 332. FIG. 12B is a view illustrating a display example in a case where the site system 2 includes three display devices 231, 232, and 233. Referring to FIG. 12A, the "slide 2" is the noteworthy image. If the number of the display devices included in the display system 23 in the site system 2 is greater than the number of the display devices in the display system 33 in the site system 3, the display conversion portion 213 converts the information on multiple images so as to arrange and display the noteworthy image of the "slide 2" on the display device, not in use, installed in the site system 2. This makes it possible to display the noteworthy image on the display device 233, not in use, allowing the viewer to easily understand that the "slide 2" is the noteworthy image.

Figure 13B:
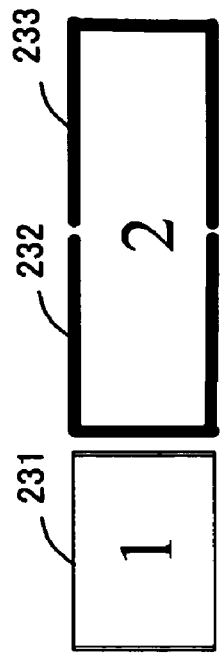
FIGS. 13A and 13B are views showing another example of display conversion in a case where the noteworthy image is filled.
Figure 13A:
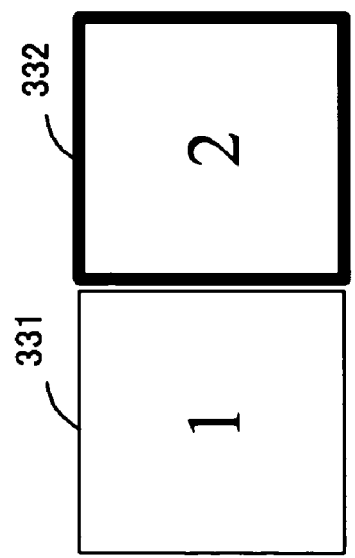

FIGS. 13A and 13B are views showing another example of display conversion in a case where the noteworthy image is filled. FIG. 13A is a view illustrating a display example in a case where the site system 3 includes two display devices 331 and 332. FIG. 13B is a view illustrating a display example in a case where the site system 2 includes three display devices 231, 232, and 233. Referring to FIGS. 13A and 13B, the display conversion portion 213 converts the information on the noteworthy image so as to magnify and display the noteworthy image of the "slide 2" on the two display devices 232 and 233.

Figure 14B:
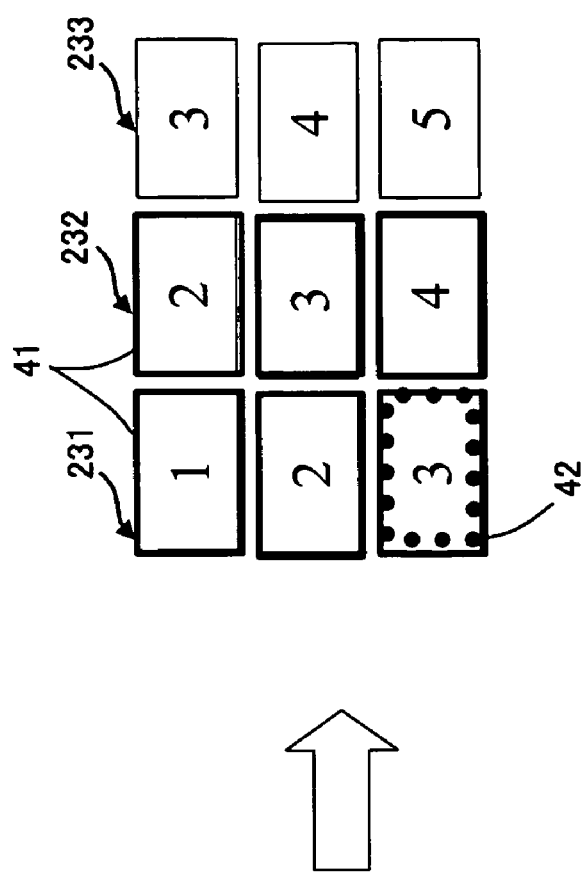
FIGS. 14A and 14B are views showing another example of display conversion in a case where the noteworthy image is filled.
Figure 14A:
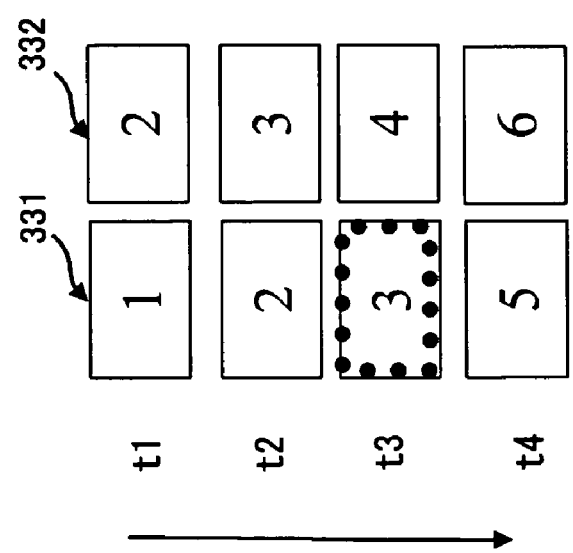

FIGS. 14A and 14B are views showing another example of display conversion in a case where the noteworthy image is filled. FIG. 14A is a view illustrating a display example in a case where the site system 3 includes two display devices 331 and 332. FIG. 14B is a view illustrating a display example in a case where the site system 2 includes three display devices 231, 232, and 233. FIG. 15 is a flowchart showing the display conversion process shown in FIGS. 14A and 14B.

Referring now to FIG. 14A, the display device 331 in the site system 3 successively displays the "slide 1", the "slide 2", the "slide 3", and the "slide 5". The display device 332 successively displays the "slide 2", the "slide 3", the "slide 4", and the "slide 6". Referring now to FIG. 14B, the display device 231 in the site system 2 successively displays the "slide 1", the "slide 2", and the "slide 3". The display device 232 successively displays the "slide 2", the "slide 3", and the "slide 4". The display device 233 successively displays the "slide 3", the "slide 4", and the "slide 5". Here, the "slide 3" is the noteworthy image.

In step S51, the display conversion portion 213 converts the images so as to fill the display device with the slides to be displayed later. Specifically, as shown in FIG. 14B, the display conversion portion 213 converts the image to display the "slide 3" on the display device 233 in the site system 2. This makes it possible to utilize the display device 233, not in use, effectively. In step S52, the display conversion portion 213 converts the images so as to surround the "slide 1" and "slide 2" with boundaries 41. Here, the "slide 1" and "slide 2" are being displayed on the display devices 331 and 332 in the site system 3 at the speaker's end. This tells the slide being displayed at the speaker's end. In step S53, if the display conversion portion 213 determines that there is the noteworthy image, the display conversion portion 213 displays the corresponding slide emphatically in step S54. This allows the viewer to learn the image, which the speaker regards as important or is taking about. In FIG. 14B, the noteworthy image of the "slide 3" is converted so that a boundary 42 may surround the "slide 3" and the image may be displayed emphatically. In the same manner, the image is converted to fill the display device, not in use, with the slide that has been displayed before.

Figure 16:
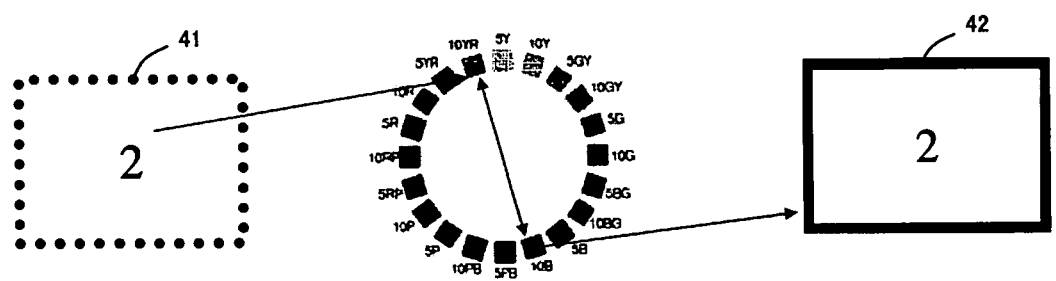
FIG. 16 is a view illustrating an emphasis process of the noteworthy image.

FIG. 16 is a view illustrating an emphasis process of the noteworthy image. The display conversion portion 213 obtains either a complementary color of a background color inside the boundary 41 of the "slide 2" to be focused on or the complementary color based on a color histogram of the boundary 41 of the "slide 2". The complementary color is employed for the color of the boundary 42 of the slide. Specifically, the display conversion portion 213 uses a color histogram, sets a most frequently used color as a representative color, and adopts the complementary color of the aforementioned representative color. This makes it possible to further emphasize the noteworthy image.

Figure 17B:
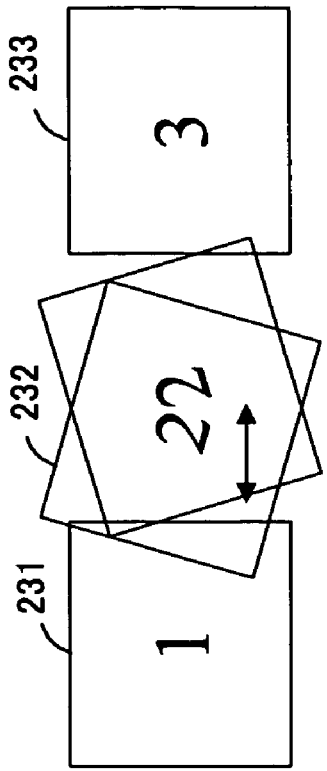
FIGS. 17A and 17B are views illustrating another example of the emphasis process of the noteworthy image.
Figure 17A:
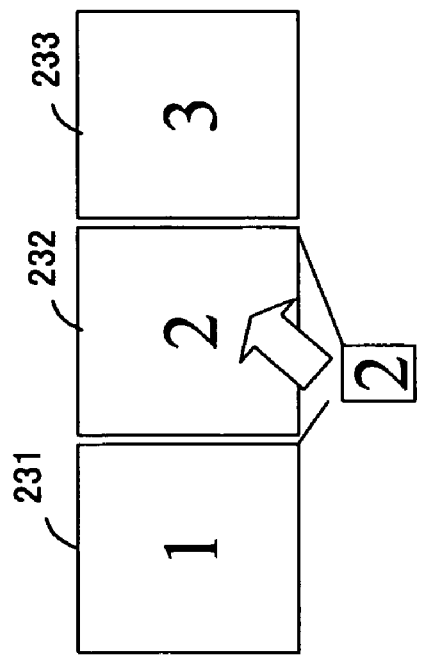

FIGS. 17A and 17B are views illustrating another example of the emphasis process of the noteworthy image. Referring to FIG. 17A, the "slides 1 through 3" are respectively displayed on the display devices 231 through 233. The display conversion portion 213 converts the information on multiple images and displays to zoom in the "slide 2" of the noteworthy image. This allows the user to know the noteworthy image in a moment according to a motion on the image. Referring now to FIG. 17B, the display conversion portion 213 converts the information on multiple images so as to display animation of the "slide 2" of the noteworthy image. Thus, the user is able to know the noteworthy image promptly according to the motion on the image.

Figure 18A:
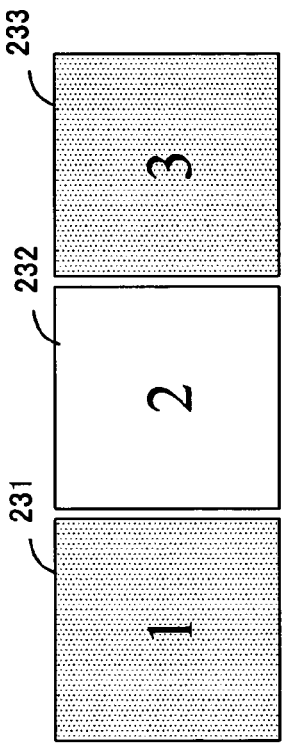
FIG. 18A is an example of emphasized display in a case where the images other than the noteworthy image are shaded.
Figure 18B:
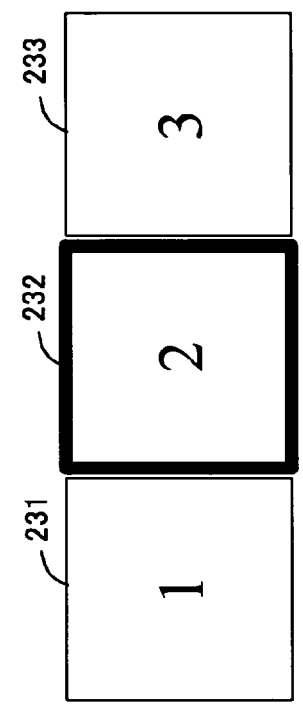
FIG. 18B is an example of emphasized display in a case where the boundary of the noteworthy image is highlighted.
Figure 18C:
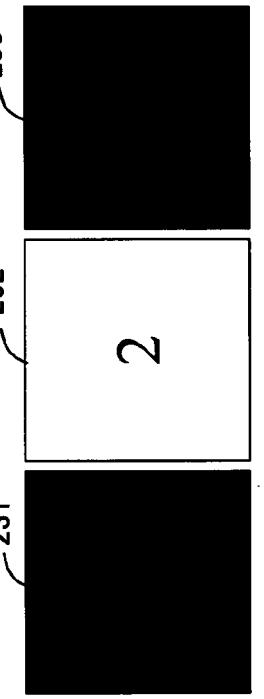
FIG. 18C is an example of emphasized display in a case where the images other than the noteworthy image are not displayed.

FIG. 18A is an example of emphasized display in a case where the images other than the noteworthy image are shaded. FIG. 18B is an example of emphasized display in a case where the boundary of the noteworthy image is highlighted. FIG. 18C is an example of emphasized display in a case where the images other than the noteworthy image are not displayed. The images that have been converted on the display conversion portion 213 are respectively shown on the display devices 231 through 233. The "slide 2" is the noteworthy image. Referring to FIG. 18A, the display conversion portion 213 converts the information on the images in order to apply shade to the images other than the "slide 2" to be focused on. Referring to FIG. 18C, the display conversion portion 213 colors the images in black other than the "slide 2" to be focused on. In addition, referring now to FIG. 18B, the display conversion portion 213 converts the information on the "slide 2" of the noteworthy image so as to display the "slide 2" with the boundary surrounding the image. In this manner, the display conversion portion 213 converts the information on multiple images in order to change the color of the noteworthy image or colors of the images other than the noteworthy image. This allows the user to know the noteworthy image immediately.

Figure 19A:
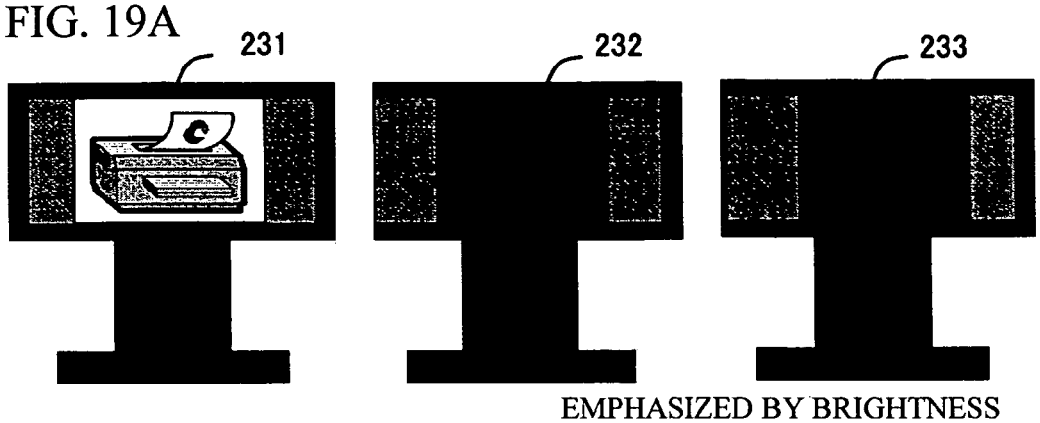
FIG. 19A is an example of emphasized display by brightness.
Figure 19B:
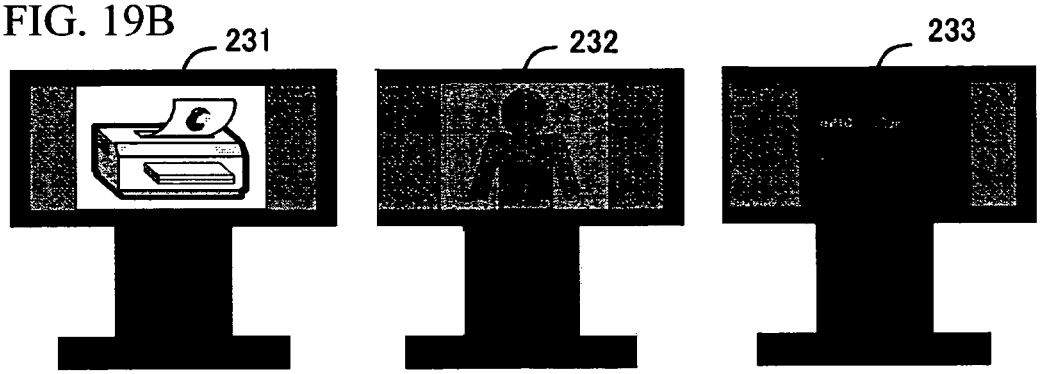
FIG. 19B is an example of emphasized display by contrast.
Figure 19C:
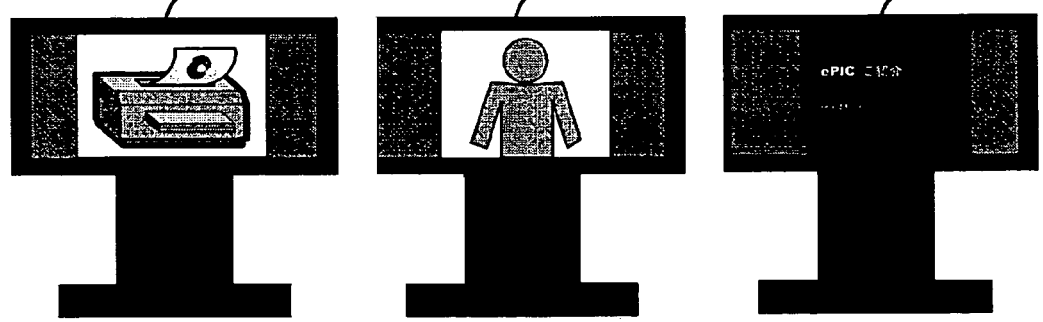
FIG. 19C is an example of emphasized display in a case where the images other than the noteworthy image are displayed in sepia.

FIG. 19A is an example of emphasized display by brightness. FIG. 19B is an example of emphasized display by contrast. FIG. 19C is an example of emphasized display in a case where the images other than the noteworthy image are displayed in sepia. Referring to FIG. 19A, the display conversion portion 213 converts the information on multiple images so as to display the image to be focused on by changing the brightness of the images. Referring to FIG. 19B, the display conversion portion 213 converts the information on multiple images so as to display the image to be focused on by changing the contrast of the images. Referring to FIG. 19C, the display conversion portion 213 converts the information on multiple images so as to display the images other than the noteworthy image in sepia. With the above-mentioned emphasized display, it is possible for the viewer to learn the noteworthy image at a glance.

Figure 20A:
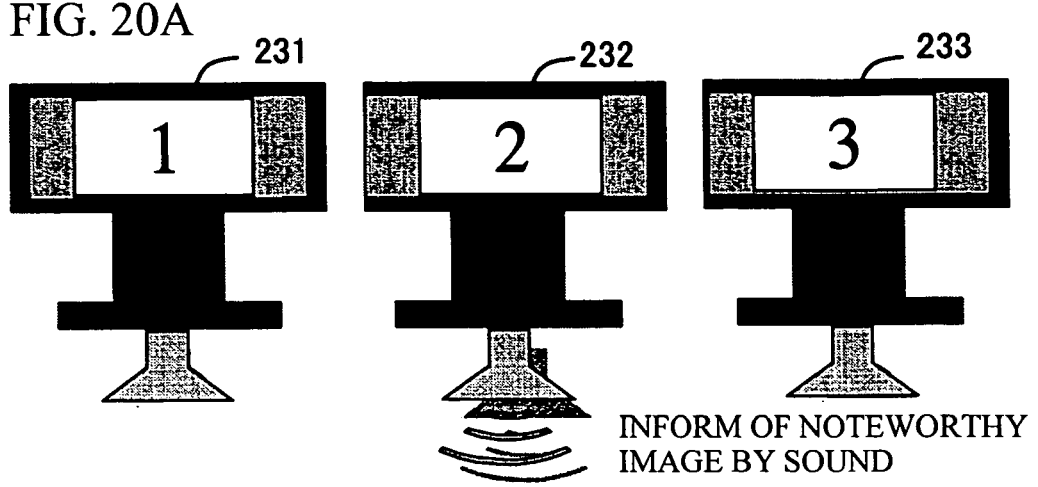
FIG. 20A is an example of informing of the noteworthy image by sound.
Figure 20B:
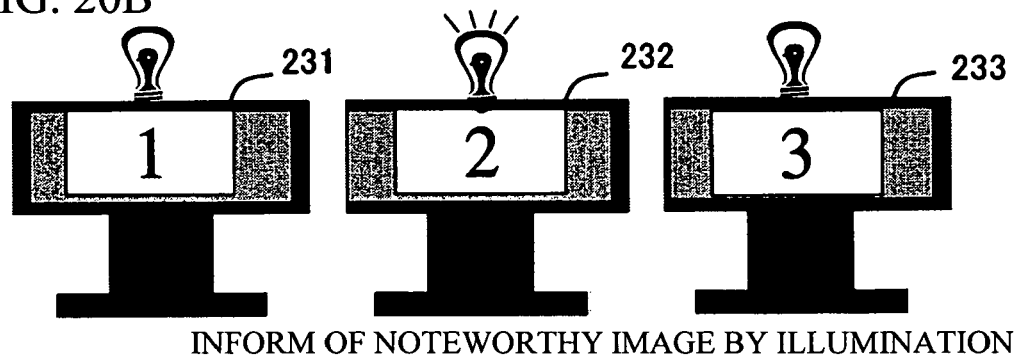
FIG. 20B is an example of informing of the noteworthy image by illumination.
Figure 20C:
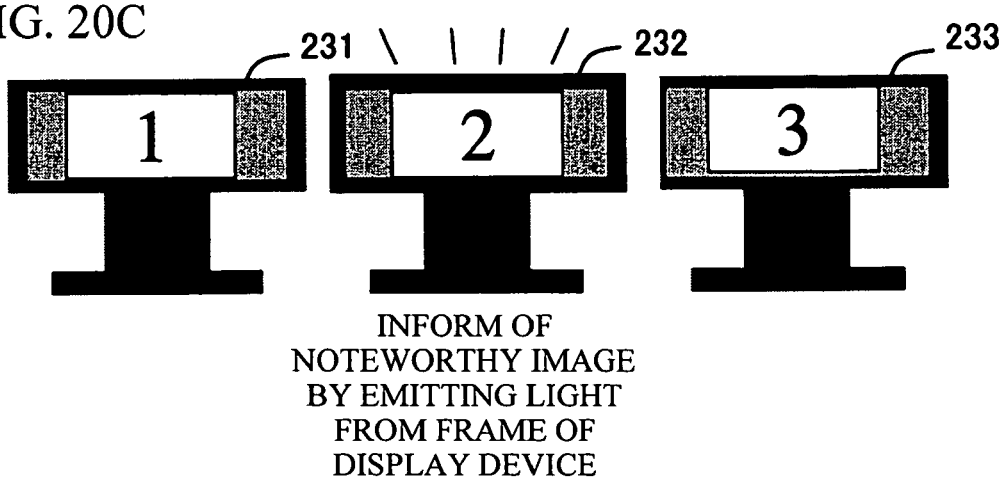
FIG. 20C is an example of informing of the noteworthy image by emitting light from the frame of the display device

FIG. 20A is an example of informing of the noteworthy image by sound. FIG. 20B is an example of informing of the noteworthy image by illumination. FIG. 20C is an example of informing of the noteworthy image by light emitted from the frame of the display device. The "slides 1 through 3" are respectively displayed on the display devices 231 though 233 in the site system 2, and the "slide 2" is the noteworthy image. Referring to FIG. 20A, the display conversion portion 213 generates a control signal to inform by sound that the "slide 2" is the noteworthy image, and outputs the control signal to the display device 232. The sound is produced from a speaker installed on the display device 232 to inform of the noteworthy image. Referring to FIG. 20B, the display conversion portion 213 generates a control signal to inform that the "slide 2" is the noteworthy image by illumination, and outputs the control signal to the display device 232. The illumination is produced from a light installed on the display device 232 to inform of the noteworthy image. This allows the user to know the noteworthy image in a moment.

Figure 21:
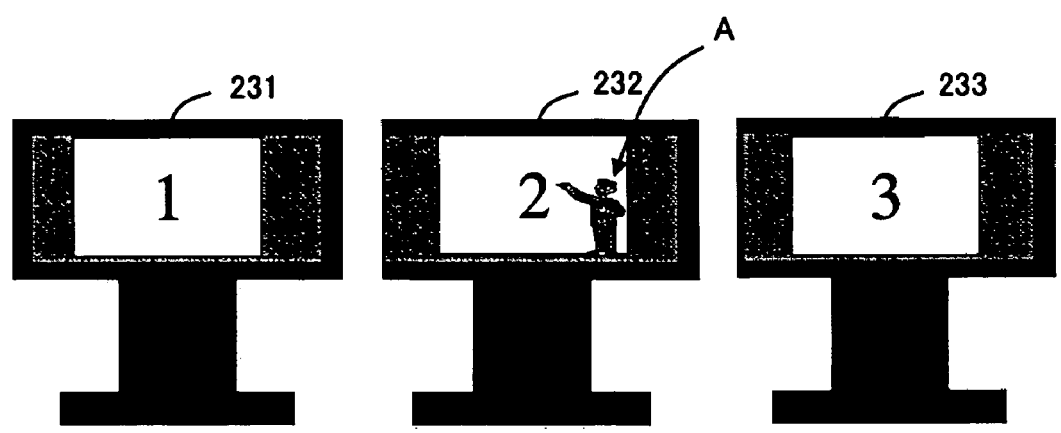
FIG. 21 shows an example of informing of the noteworthy image with avatar (object)

FIG. 21 shows an example of informing of the noteworthy image with avatar (object). Referring to FIG. 21, the "slides 1 through 3" are respectively shown on the display devices 231 through 233 in the site system 2. The display conversion portion 213 generates the information on multiple images so as to let the viewer know the noteworthy image of the "slide 2" promptly, by using an avatar A. The viewer is able to know the existence of the avatar A at a glance.

Figure 22:
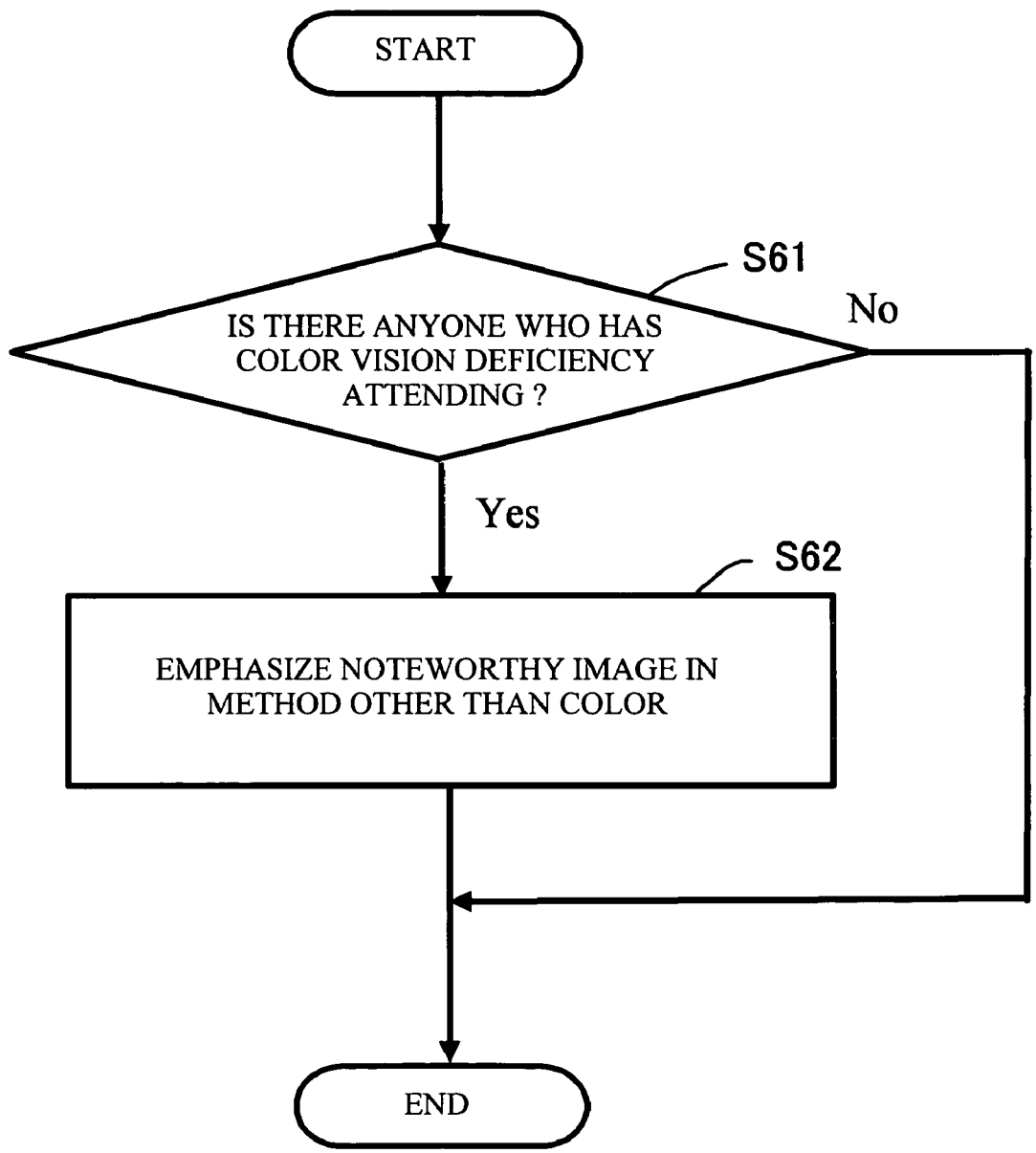
FIG. 22 is a flowchart of a process of display conversion in a case where there is someone who has color vision deficiency.

FIG. 22 is a flowchart of a process of display conversion in a case where there is someone who has color vision deficiency. In step S61, the display conversion portion 213 determines whether someone who has color vision deficiency is attending the meeting according to the information input by the user. If someone who has color vision deficiency is attending the meeting, the display conversion portion 213, in step S62, emphasizes the noteworthy image in a method, as shown in FIG. 20A, other than the visibly-apparent display method with colors.

In accordance with embodiments of the present invention, it is possible to provide the easily viewable images to the viewer without degrading the information that should be focused on while the information is being shared between the sites, even if the numbers of the display devices installed in the sites are different. In addition, the viewer is able to understand the image that the viewer has to watch carefully, because the image that should be watched carefully is displayed with emphasis. On the remote conference to be held in multiple sites that include multiple display devices respectively, it is possible to display the images without considering the display device configuration, and in addition, the speaker is able to let the viewer know what the speaker wants the viewer to look at.

A display control method in accordance with an embodiment of the present invention is operated by the management server 21. The management server 21 is realized with a CPU (Central Processing Unit), ROM (Read Only Memory), RAM (Random Access Memory), and the like, by installing a program from a portable memory device or a storage device such as a hard disc device, CD-ROM, DVD, or a flexible disc or downloading the program through a communications line. Then the steps of program are executed as the CPU operates the program. The management server 21 receives information on a noteworthy image selected from said multiple images and setup information on at least one display device installed in the second site, determines a difference in number of display devices installed in the first site and the number of the display devices installed in the second site, on the basis of the setup information on said at least one display device, and converts the information on said multiple images to display the noteworthy image in priority, on the basis of a result determined by the determination portion and the information on the noteworthy image.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-179987 filed on Jun. 20, 2005 including specification, claims, drawings, and abstract is incorporated herein by reference in its entirety.

What is claimed is:

1. A display control apparatus for converting multiple images displayed in a first site to display said multiple images in a second site, the display control apparatus comprising:
   a receiver that receives information on a noteworthy image selected from said multiple images and setup information on at least one display device installed in the second site;
   a determination portion that determines a difference in a first number of display devices installed in the first site and a second number of display devices installed in the second site, on the basis of the setup information on said at least one display device; and
   a conversion portion that converts information on said multiple images to display the noteworthy image in priority, on the basis of a result determined by the determination portion and information on the noteworthy image,
   wherein the conversion portion converts the information on said multiple images to change at least one of a color of the noteworthy image and those of other images.

2. A display control apparatus for converting multiple images displayed in a first site to display said multiple images in a second site, the display control apparatus comprising:
   a receiver that receives information on a noteworthy image selected from said multiple images and setup information on at least one display device installed in the second site;
   a determination portion that determines a difference in a first number of display devices installed in the first site and a second number of display devices installed in the second site, on the basis of the setup information on said at least one display device; and
   a conversion portion that converts information on said multiple images to display the noteworthy image in priority, on the basis of a result determined by the determination portion and information on the noteworthy image,
   wherein the conversion portion converts the information on said multiple images to display the noteworthy image with a boundary thereof being highlighted.

3. The display control apparatus as claimed in claim 2, wherein the conversion portion obtains either a complementary color of a background color inside the boundary of the noteworthy image or the complementary color based on a color histogram of the noteworthy image, and employs the complementary color for the boundary.

4. A display control apparatus for converting multiple images displayed in a first site to display said multiple images in a second site, the display control apparatus comprising:
   a receiver that receives information on a noteworthy image selected from said multiple images and setup information on at least one display device installed in the second site;
   a determination portion that determines a difference in a first number of display devices installed in the first site and a second number of display devices installed in the second site, on the basis of the setup information on said at least one display device; and
   a conversion portion that converts information on said multiple images to display the noteworthy image in priority, on the basis of a result determined by the determination portion and information on the noteworthy image,
   wherein the conversion portion converts the information on said multiple images to display the noteworthy image by changing at least one of brightness and contrast.

5. A display control apparatus for converting multiple images displayed in a first site to display said multiple images in a second site, the display control apparatus comprising:
   a receiver that receives information on a noteworthy image selected from said multiple images and setup information on at least one display device installed in the second site;

a determination portion that determines a difference in a first number of display devices installed in the first site and a second number of display devices installed in the second site, on the basis of the setup information on said at least one display device; and
a conversion portion that converts information on said multiple images to display the noteworthy image in priority, on the basis of a result determined by the determination portion and information on the noteworthy image,
further comprising a generation portion that generates a control signal to inform of the noteworthy image by illumination.

* * * * *